United States Patent
Koch et al.

(10) Patent No.: US 7,670,709 B2
(45) Date of Patent: Mar. 2, 2010

(54) FUEL CELL SEAL WITH INTEGRAL BRIDGE

(75) Inventors: Steve George Koch, Gregory, MI (US); Jeffrey Alan Smith, Brighton, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 1135 days.

(21) Appl. No.: 10/541,119

(22) PCT Filed: Dec. 23, 2003

(86) PCT No.: PCT/US03/41287

§ 371 (c)(1), (2), (4) Date: Jun. 30, 2005

(87) PCT Pub. No.: WO2004/061338

PCT Pub. Date: Jul. 22, 2004

(65) Prior Publication Data

US 2006/0127736 A1    Jun. 15, 2006

Related U.S. Application Data

(60) Provisional application No. 60/437,540, filed on Dec. 31, 2002.

(51) Int. Cl.
*H01M 8/02* (2006.01)
*H01M 8/10* (2006.01)
(52) U.S. Cl. .......................................................... 429/35
(58) Field of Classification Search .............. 429/34–36
See application file for complete search history.

(56) References Cited

U.S. PATENT DOCUMENTS

| | | | |
|---|---|---|---|
| 3,231,289 A | 1/1966 | Carrell | |
| 4,437,785 A | 3/1984 | Puccio | |
| 4,735,718 A | 4/1988 | Peters | |
| 4,911,993 A * | 3/1990 | Turley et al. | 429/27 |
| 6,350,538 B1 | 2/2002 | Wilkinson et al. | |
| 6,423,439 B1 | 7/2002 | Barton et al. | |
| 6,716,550 B1 | 4/2004 | Kirby et al. | |
| 6,991,868 B2 * | 1/2006 | Lee et al. | 429/38 |
| 7,070,876 B2 | 7/2006 | Artibise et al. | |
| 2003/0013001 A1 * | 1/2003 | Koch et al. | 429/35 |
| 2004/0018412 A1 * | 1/2004 | Orsbon et al. | 429/37 |

FOREIGN PATENT DOCUMENTS

| | | | |
|---|---|---|---|
| DE | 10028395 A1 * | 12/2000 | |
| JP | 04196062 A * | 7/1992 | |
| JP | 07220742 A * | 8/1995 | |
| JP | 2001336640 A * | 12/2001 | |

* cited by examiner

*Primary Examiner*—Gregg Cantelmo
(74) *Attorney, Agent, or Firm*—Ronald W. Wangerow; Harness, Dickey & Pierce, P.L.C.

(57) ABSTRACT

The invention is drawn to a gasket (34) for use in an individual fuel cell (20). The gasket (34) includes at lest one generally rigid bridge (44) or (46) that extends across the fluid flow channels in adjacent separator plates (38) and (40). The bridge (44) or (46) assures that the fluid flow channels are not blocked or restricted in the cell (20). Each bridge (44) or (46) may be integral with its corresponding gasket (34). The gasket (34) may be a multi-piece gasket with a carrier material having an elastrometric seal portion (74) secured to it.

20 Claims, 2 Drawing Sheets

FUEL CELL SEAL WITH INTEGRAL BRIDGE

BACKGROUND OF INVENTION

This invention relates in general to static seals and more particularly to a gasket employed for sealing between components in a fuel cell.

A fuel cell is an electrochemical energy converter that includes two electrodes placed on opposite surfaces of an electrolyte. In one form, an ion-conducting polymer electrolyte membrane is disposed between two electrode layers (also sometimes called gas diffusion layers), with layers of a catalyst material between the membrane and the electrode layers, to form a membrane electrode assembly (MEA). The MEA is used to promote a desired electrochemical reaction from two reactants. One reactant, oxygen or air, passes over one electrode while hydrogen, the other reactant, passes over the other electrode. The oxygen and hydrogen combine to produce water, and in the process generate electricity and heat.

An individual cell within a fuel cell assembly includes a MEA placed between a pair of separator plates (also sometimes called flow field plates). The separator plates are typically fluid impermeable and electrically conductive. Fluid flow passages or channels are formed adjacent to each plate surface at an electrode layer to facilitate access of the reactants to the electrodes and the removal of the products of the chemical reaction.

In such fuel cells, resilient gaskets or seals are typically provided between the faces of the MEA and the perimeter of each separator plate to prevent leakage of the fluid reactant and product streams. Since the fuel cell operates with oxygen and hydrogen, it is important to provide a seal that not only seals well against hydrogen, oxygen and water, but that will seal well as the temperature changes due to the heat that is given off during fuel cell operation. To assure a good seal, the seals need to be formed accurately as well as aligned properly with the other components. In particular, the gaskets can be difficult to assemble into a cell because they are flexible and may have a tendency to bend or twist. This can make proper alignment of the cell components time consuming and prone to misassembly. Moreover, in order to assure a good seal around the entire gasket, a certain amount of force (a sealing force) is applied to hold the separator plates against the gaskets. But this may cause portions of the gasket to be pressed into the fluid flow channels of the separator plates, which restricts the flow channels in the separator plates.

Thus, it is desirable to have a gasket of an individual cell of a fuel cell that is relatively easy to align during an assembly operation while assuring the proper sealing for the finished assembly, and which will not interfere with the flow channels in the separator plate.

SUMMARY OF INVENTION

In its embodiments, the present invention contemplates an apparatus for use in an individual cell that includes a gasket having opposed sides about a perimeter, with the gasket including at least one generally rigid bridge extending between the opposed sides.

The present invention further contemplates an individual cell adapted for use in a fuel cell assembly having a membrane electrode assembly including a first gasket mounted about a first gas diffusion layer and a second gasket mounted about a second gas diffusion layer. A first separator plate includes a first set of flow channels, and a second separator plate including a second set of flow channels; wherein the first gasket includes at least one first generally rigid bridge extending adjacent the first set of flow channels, and the second gasket includes at least one second generally rigid bridge extending adjacent the second set of flow channels.

The present invention also contemplates a method of assembling a gasket to a separator plate that has fluid flow channels, the method comprising the steps of: forming a generally rigid bridge on the gasket; locating the bridge adjacent the fluid flow channels; and compressing the gasket against the separator plate with a sealing load.

An advantage of the present invention is that a gasket component having a bridge adjacent to channels in a separator plate will significantly reduce or eliminate gasket material being forced into the channels. Thus, the flow of fluids in the channels is not reduced or blocked, while still allowing for the required sealing force between the gasket and other cell components.

Another advantage of the present invention is that the bridge, being preferably integrally molded to the gasket, will not add to the number of components that need to be assembled to form an individual cell.

DETAILED DESCRIPTION

Figure 1:
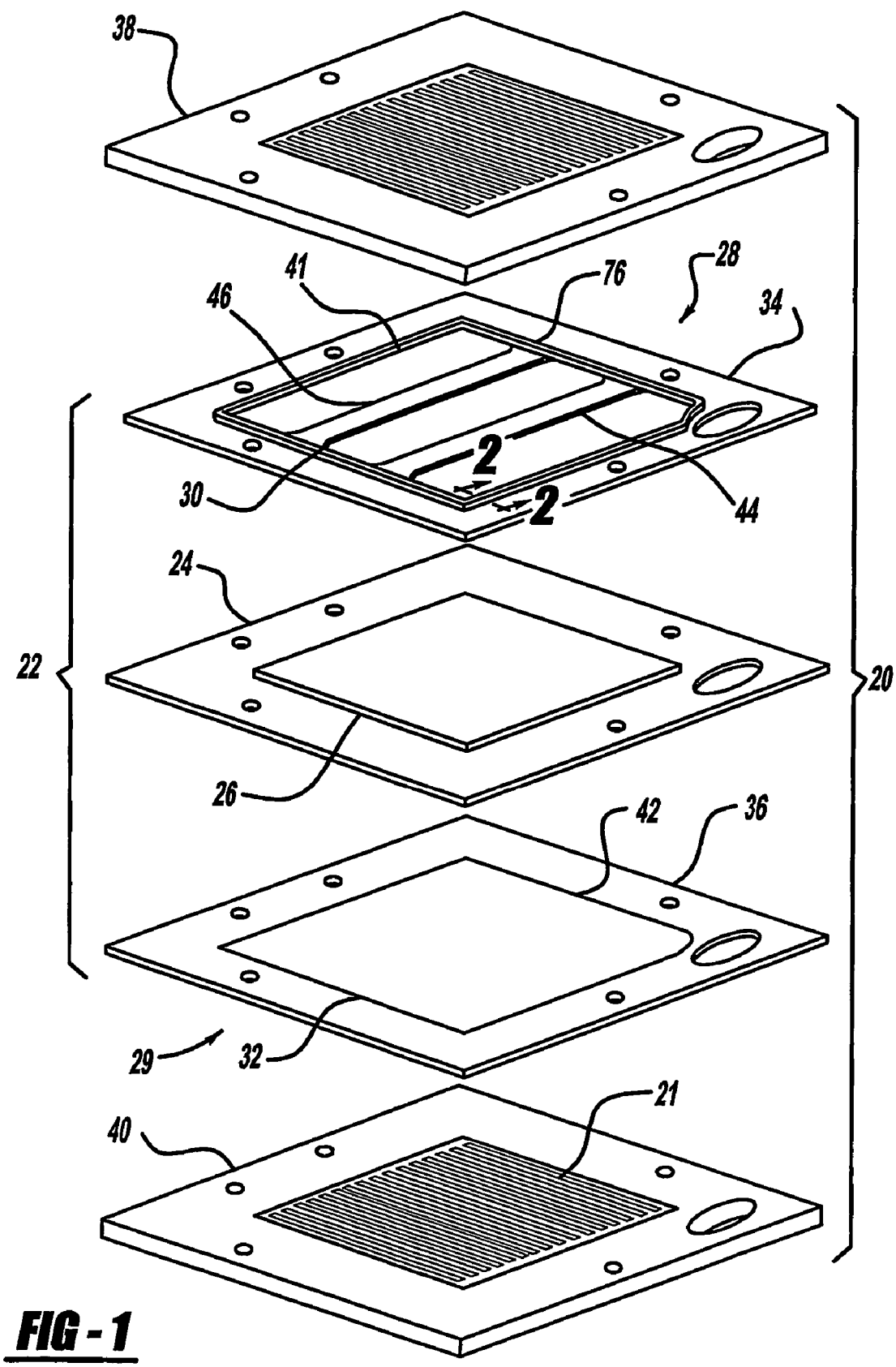
FIG. 1 is an schematic, exploded, perspective view of an individual cell of a fuel cell assembly.
Figure 2:
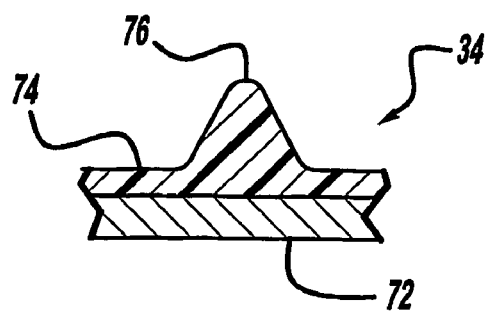
FIG. 2 is a partial, sectional view of a gasket assembly, taken along line 2-2 in FIG. 1.

FIGS. 1-2 illustrate an individual cell 20 for use in a fuel cell assembly. The individual cell 20 preferably includes a gasket unitized membrane electrode assembly (MEA) 22, (although the gasket may be separate rather than unitized, if so desired). The MEA 22 is made up of a membrane 24, with a layer of catalyst material 26 on both sides of the membrane 24. The MEA 22 also includes a first gas diffusion layer (GDL) 30 and second GDL 32 on either side of the layers of catalyst material 26, and a first gasket 34 and a second gasket 36, secured around the perimeters 41, 42 of the first GDL 30 and the second GDL 32, respectively. Preferably, the gaskets 34, 36 are secured to the GDLs 30, 32 by adhesive, although other means of securing may be used if so desired, such as molding each gasket to its GDL. Each GDL 30, 32 and its corresponding gasket 34, 36 forms a unitized seal-diffusion assembly 28, 29, respectively. The unitized seal-diffusion assemblies 28, 29 are preferably secured to the membrane 24 with an adhesive, although other means of securing may also be employed. A first separator plate 38 mounts against the first gasket 34 and the first GDL 30, and a second separator plate 40 mounts against the second gasket 36 and the second GDL 32, in order to form the individual cell 20. Since the relative thicknesses of the various components are very thin, they are only depicted schematically in the figures in order to aid in describing the invention. The actual thicknesses of the components may vary according to the particular application of the fuel cell and are known to those skilled in the art. Also, the components of the cell 20 are generally symmetric about the membrane 24.

The membrane 24 is preferably an ion-conducting, polymer, electrolyte membrane, as generally employed in this type of fuel cell application. The catalyst material 26 is preferably platinum or other suitable catalyst material for a typical polymer electrode membrane type of fuel cell application. The first and second GDLs 30, 32 are preferably a carbonized fiber, or may be another suitable gas permeable material for use as an electrode in a fuel cell. The MEA 22 can include a catalyzed membrane with GDLs assembled thereto, or a membrane assembled between two catalyzed GDLs, each of which is known to those skilled in the art.

The gaskets 34, 36, are each preferably a multi-piece gasket with a thin, flexible carrier 72 upon which an elastomeric seal 74 is secured—with the elastomeric seal 74 preferably including a sealing bead 76 projecting therefrom, (only one shown in FIGS. 1 and 2). The carrier 72 preferably has a thickness of less than 1.0 millimeters and is preferably made from a polymeric material—although, optionally, a polymer or a thin layer of metal may be employed instead, if so desired. The elastomeric seal 74 is preferably molded to the carrier 72, although other means of securing the two may also be employed. The sealing bead 76 is compressed against the surface of its corresponding separator plate 38, 40 and held with sufficient sealing force to prevent migration of fluid past the seal along the surface of the particular separator plate 38, 40. While the sealing bead 76 is shown in the shape of a triangle, different shapes may also be employed, if so desired. Also, as an alternative, the gaskets 34, 36, may be a single molded piece, rather than a multi-piece assembly. Further, as an alternative, the carrier 72 may include elastomeric gaskets secured on both sides rather than just one elastomeric seal, thus reducing the adhesive needed for securing and sealing cell components together.

The first and second separator plates 38, 40 are generally rectangular in shape, although other shapes can also be employed if so desired. Each plate includes fluid flow channels 21 to facilitate access of the reactants to the electrodes (gas diffusion layers) and the removal of the products of the chemical reaction. The plates 38, 40 have outer surfaces that are made to mate with adjoining individual cells in order to make up a completed fuel cell assembly.

The first gasket 34 includes a first bridge 44 and a second bridge 46, and the second gasket 36 also includes the same bridges, not illustrated in FIGS. 1 and 2. While two bridges 44, 46 are shown, any number of bridges may be employed, as is desired to accomplish the objective. Each bridge 44, 46 extends across its unitized seal diffusion assembly 28, 29, and is formed of a material that is sufficiently rigid to avoid being pressed into the fluid flow channels 21. The bridges 44, 46 are preferably integrally molded with its corresponding gasket 34, 36 in order to simplify the assembly of the cell 20, but they may be separate, if so desired.

Figure 3:
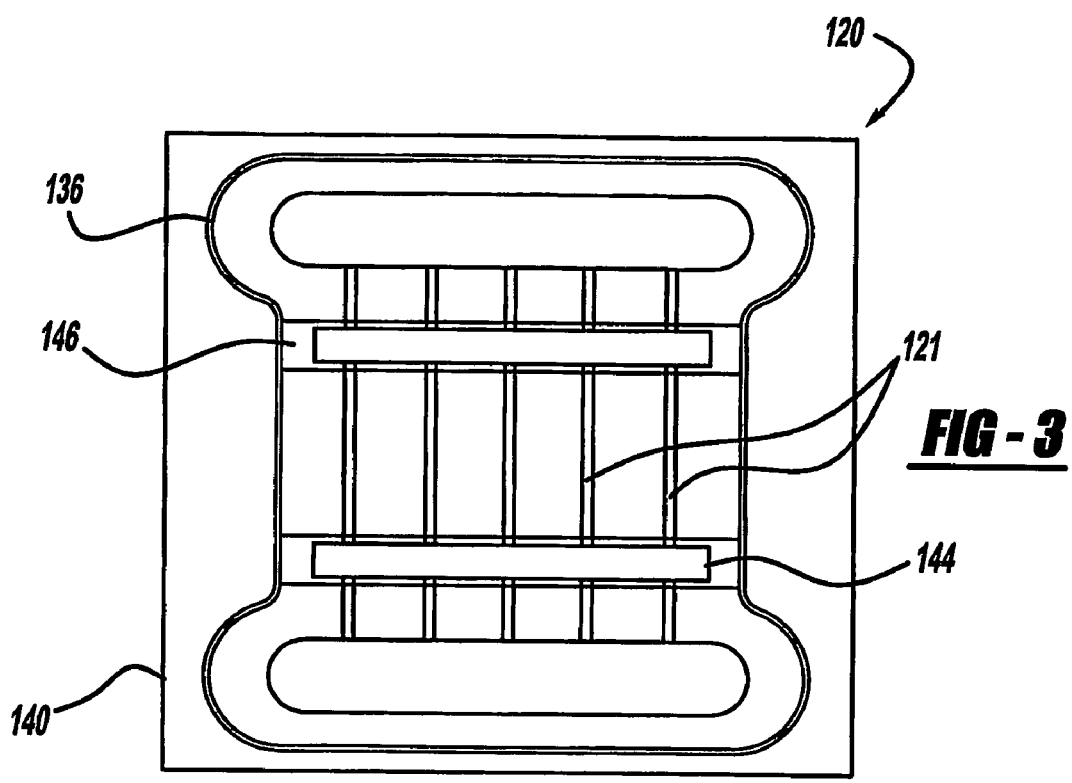
FIG. 3 is a plan view of a gasket and gas diffusion layer in accordance with another embodiment of the present invention.
Figure 4:
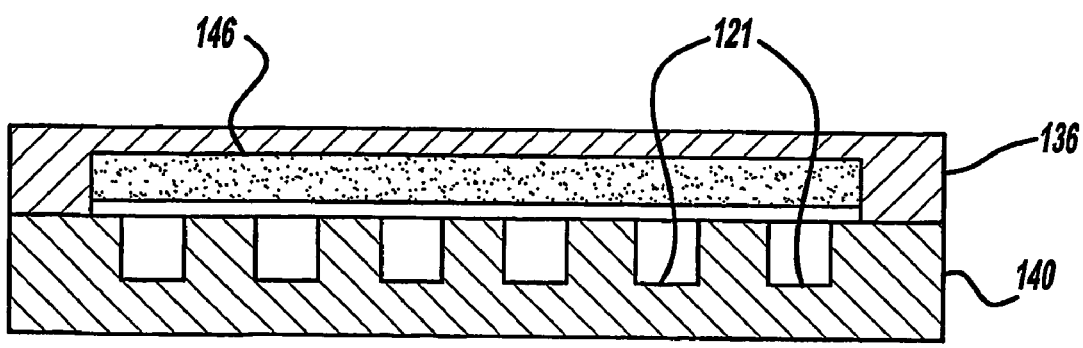
FIG. 4 is a schematic, sectional view of a portion of a gasket and separator plate.

FIGS. 3 and 4 illustrate another embodiment of the present invention. In this embodiment, similar elements to the first embodiment will be similarly designated, but with a 100 series number. The separator plate 140 mates with the gasket 136, with the gasket 136 surrounding the flow channels 121. A pair of rigid inserts 144, 146 are included with the gasket 136 and extend transversely across the channels 121 in order to assure that there are no blockages formed in the channels 121 when the sealing pressure is applied to the cell 120.

While certain embodiments of the present invention have been described in detail, those familiar with the art to which this invention relates will recognize various alternative designs and embodiments for practicing the invention as defined by the following claims.

What is claimed is:

1. An apparatus for sealing a perimeter of an individual cell of a fuel cell assembly comprising:
    a gasket including opposed sides defining a perimeter seal for a reactant flow field of the individual cell defined by a separator plate of the fuel cell assembly and configured to be located between the reactant flow field and a corresponding catalyst membrane; and
    at least one generally rigid bridge extending between and fixed to the opposed sides and extending across flow channels in the separator plate defining the reactant flow field.

2. The apparatus of claim 1 further including a gas diffusion layer having a perimeter, and with the gasket shaped to surround and mate with the perimeter of the gas diffusion layer.

3. The apparatus of claim 1 wherein the gasket includes a carrier layer and an elastomeric seal layer mounted thereto.

4. The apparatus of claim 1 wherein the bridge is integral with the gasket.

5. The apparatus of claim 1 wherein the at least one bridge is two bridges.

6. An individual cell adapted for use in a fuel cell assembly comprising:
    a membrane electrode assembly including a first gasket mounted about and defining a perimeter seal for a first gas diffusion layer and a second gasket mounted about and defining a perimeter seal for a second gas diffusion layer;
    a catalyst membrane having first and second sides opposite one another;
    a first separator plate located on the first side of the catalyst membrane and including a first set of reactant flow channels facing the first side;
    a second separator plate located on the second side of the catalyst membrane and including a second set of reactant flow channels facing the second side; and
    wherein the first gasket is located between the first side of the catalyst membrane and the first set of reactant flow channels and includes at least one first generally rigid bridge fixed to opposite sides of the first gasket and extending across the first set of flow channels, and the second gasket is located between the second side of the catalyst membrane and the second set of reactant flow channels and includes at least one second generally rigid bridge fixed to opposite sides of the second gasket and extending across the second set of flow channels.

7. The individual cell of claim 6 wherein the first generally rigid bridge is integral with the first gasket.

8. The individual cell of claim 7 wherein the second generally rigid bridge is integral with the second gasket.

9. The individual cell of claim 6 wherein the first gasket includes a carrier layer and an elastomeric seal layer mounted thereto.

10. The individual cell of claim 9 wherein the second gasket includes a carrier layer and an elastomeric seal layer mounted thereto.

11. A method of assembling a gasket to a separator plate that has reactant fluid flow channels, the method comprising the steps of:
    forming a generally rigid bridge on the gasket;
    locating the gasket adjacent the reactant fluid flow channels between the separator plate and a corresponding catalyst membrane, wherein the bridge extends across the channels; and
    compressing the gasket against the separator plate with a sealing load.

12. The method of claim 11 wherein the bridge is located outside of the channels after the compressing.

13. The method of claim 11 further comprising securing a gas diffusion layer to the gasket.

14. The method of claim 13 wherein the securing includes molding the gasket to the gas diffusion layer.

15. The method of claim 11 wherein the bridge extends transversely across the channels.

16. The method of claim 11 wherein the forming includes integrally molding the bridge with the gasket.

17. The apparatus of claim 1 wherein the bridge extends transversely across the channels.

18. The individual cell of claim 6 wherein the bridge extends transversely across the channels.

19. The apparatus of claim 2 wherein the bridge is configured to be located directly adjacent to the diffusion media and the flow channels.

20. The individual cell of claim 6 wherein the first bridge is located directly between the first gas diffusion layer and the first set of reactant flow channels and the second bridge is located directly between the second gas diffusion layer and the second set of reactant flow channels.

* * * * *

UNITED STATES PATENT AND TRADEMARK OFFICE
CERTIFICATE OF CORRECTION

PATENT NO. : 7,670,709 B2
APPLICATION NO. : 10/541119
DATED : March 2, 2010
INVENTOR(S) : Koch et al.

It is certified that error appears in the above-identified patent and that said Letters Patent is hereby corrected as shown below:

Page 1, in the References Cited, under U.S. Patent Documents, please add --2004/0191604 A1 9/2004 Artibise et al.--.

Signed and Sealed this

Thirteenth Day of July, 2010

David J. Kappos
*Director of the United States Patent and Trademark Office*